United States Patent [19]

Nussmeier

[11] 4,355,900

[45] Oct. 26, 1982

[54] SELF-CALIBRATING INTERFEROMETER

[75] Inventor: Thomas A. Nussmeier, Thousand Oaks, Calif.

[73] Assignee: The United States of America as represented by the Secretary of the Air Force, Washington, D.C.

[21] Appl. No.: 176,435

[22] Filed: Aug. 8, 1980

[51] Int. Cl.³ .............................................. G01B 11/02
[52] U.S. Cl. ..................................... 356/356; 356/358
[58] Field of Search ............... 356/353, 354, 356, 358, 356/355, 357

[56] References Cited

U.S. PATENT DOCUMENTS

| | | | |
|---|---|---|---|
| 3,353,115 | 11/1967 | Maiman | 331/94.5 |
| 3,392,622 | 6/1968 | Senf | 356/350 |
| 3,586,416 | 6/1971 | De Bitetio | 350/160 |
| 3,659,510 | 5/1972 | Garuin et al. | 95/12 |
| 3,825,348 | 7/1974 | Normarski et al. | 356/349 |
| 3,868,185 | 2/1975 | Genzel et al. | 356/346 |
| 4,052,129 | 10/1977 | Schawlow et al. | 356/349 |

*Primary Examiner*—Bruce Y. Arnold
*Attorney, Agent, or Firm*—Donald J. Singer; Jacob N. Erlich

[57] ABSTRACT

A self-calibrating interferometer which forms therein a pair of Michelson interferometers with one beam length of each Michelson interferometer being controlled by a common phase shifter. The transfer function measured from the phase shifter to either of a pair of detectors is sinusoidal with a full cycle for each half-wavelength of phase shifter travel. The phase difference between these two sinusoidal detector outputs represents the optical phase difference between a path of known distance and a path of unknown distance.

10 Claims, 4 Drawing Figures

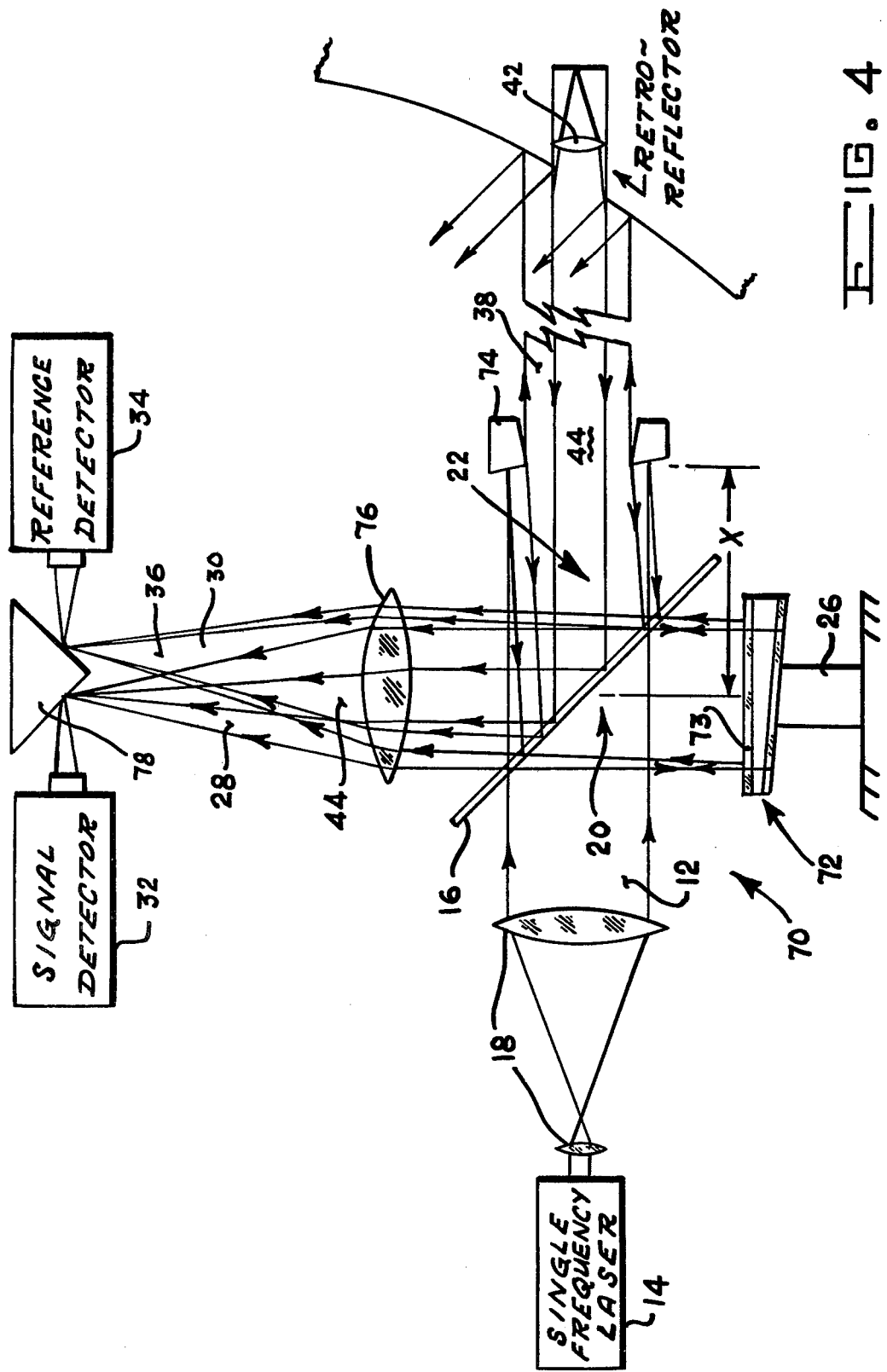

SELF-CALIBRATING INTERFEROMETER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to distance measurement systems and techniques, and, more particularly to a self-calibrating interferometer for measuring the differential phase shift between two paths, one of known length and one of unknown length.

In todays highly industrialized and highly technological soceity it becomes more and more essential to provide devices and/or techniques capable of measuring distances over relatively long paths. Such a case would be, for example, in the alignment of large telescopes constructed from small sub-apertures wherein accuracy of less than 0.1 mm over ranges of up to 50 meters are required.

One such instrument and technique for measuring distances over relatively long paths with resolution of up to a small fraction of an optical wavelength is set forth in U.S. patent application Ser. No. 152,232 filed May 22, 1980 by the inventor. In this technique it is essential that the phase difference between the receipt of two signals, one from a known distance and the other from an unknown distance be detected. Traditionally, phase comparison for distance measurement has been conducted using heterodyne conversion of the measurement frequencies to lower frequencies, amplification of the converted frequencies through carefully matched amplifiers, and electronic phase comparison after this conversion and amplification process. Errors are introduced at all points in the conversion and amplification process since the above-mentioned elements are included in the two paths being measured and compared. Consequently, a need exists for an interferometer capable of utilization within a distance measurement instrument, of for example, the type described by the inventor in application Ser. No. 152,232 in which distance measurement is required at high precision (less than 1 mm) and the operation must be automatic or remotely controlled.

SUMMARY OF THE INVENTION

The instant invention overcomes the problems encountered in the past by providing an interferometer which is capable of making phase comparison before demodulation, thereby simplifying the electronics and removing the requirement for a carefully matched amplifier chain. By utilization of separate optical reference paths any requirement for a variable path with a precisely known length is eliminated. In addition, the use of a common phase shifter for the two interferometer paths within the interferometer of this invention allow simultaneous measurement and calibration thereby effectively allowing use of the same instrument for measurement at many different wavelengths.

The interferometer of this invention is primarily, although not necessarily, designed for use in a multi-wavelength distance measuring device where the differential phase shift between two paths, a known reference path and an unknown path is measured at each of several wavelengths and the unknown distance is calculated. The ambiguity inherent in the measurement at a single wavelength is resolved by combination of the multi-wavelength measurements.

Incoporated within the interferometer of this invention is a single phase shifter. An electromagnetic beam of radiation, preferably in the form of a laser beam is expanded to fill a beam splitter, which divides the beam into a pair of beams hereinafter referred to as a local beam and a remote beam. The local beam illuminates a reflecting element mounted on the phase shifter. The reflecting element divides the local beam into two portions separated by a slight angle. These two portions of the local beam are reflected back through the beam splitter to a pair of detectors, one for each of the spatially separated portions of the local beam.

The remote beam is also split into two portions. This is achieved by a reference flat which intercepts the remote beam. The reference flat is optically aligned with the remote beam so as to reflect a portion of the remote beam back to the beam splitter and from there to one of the detectors, hereinafter referred to as the reference detector. The portion of the local beam reflected from the phase shifter and the portion of the remote beam reflected from the reference flat will form interference fringes on the reference detector thereby causing intensity variations as a function of the differential path length.

The remaining portion of the remote beam passes by the reference flat and illuminates a retro-reflector located at a remote location of unknown distance from the interferometer. The retro-reflector reflects that portion of the remote beam impinging thereupon back to the beam splitter from where it is directed to the other detector, hereinafter referred to as the signal detector. At the signal detector, this portion of the remote beam interferes with the portion of the local beam impinging upon the signal detector and also creates interference fringes and intensity variations.

In other words, within the interferometer of this invention two Michelson interferometers are formed, one beam length of each of the Michelson interferometers being controlled by the common (or single) phase shifter. The transfer function measured from the phase shifter to either detector is sinusoidal with a full cycle for each half-wavelength of phase shifter travel. The phase difference between these two sinusoidal detector outputs represents the optical phase difference between the reference and signal portions (paths) of the remote beam of the interferometer.

It is therefore an object of this invention to provide an interferometer for precisely measuring differential phase shifts between two paths.

It is another object of this invention to provide an interferometer which allows for simultaneous measurement and calibration.

It is still another object of this invention to provide an interferometer which is capable of making measurements at many different wavelengths.

It is a further object of this invention to provide an interferometer which substantially reduces noise in the detectors and pre-amplifiers utilized therewith.

It is still a further object of this invention to provide an interferometer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 4 is a schematic representation of an alternate embodiment of this invention.

DETAILED DESCRIPTION OF THE PREFERRED EMBODIMENTS

Figure 1:
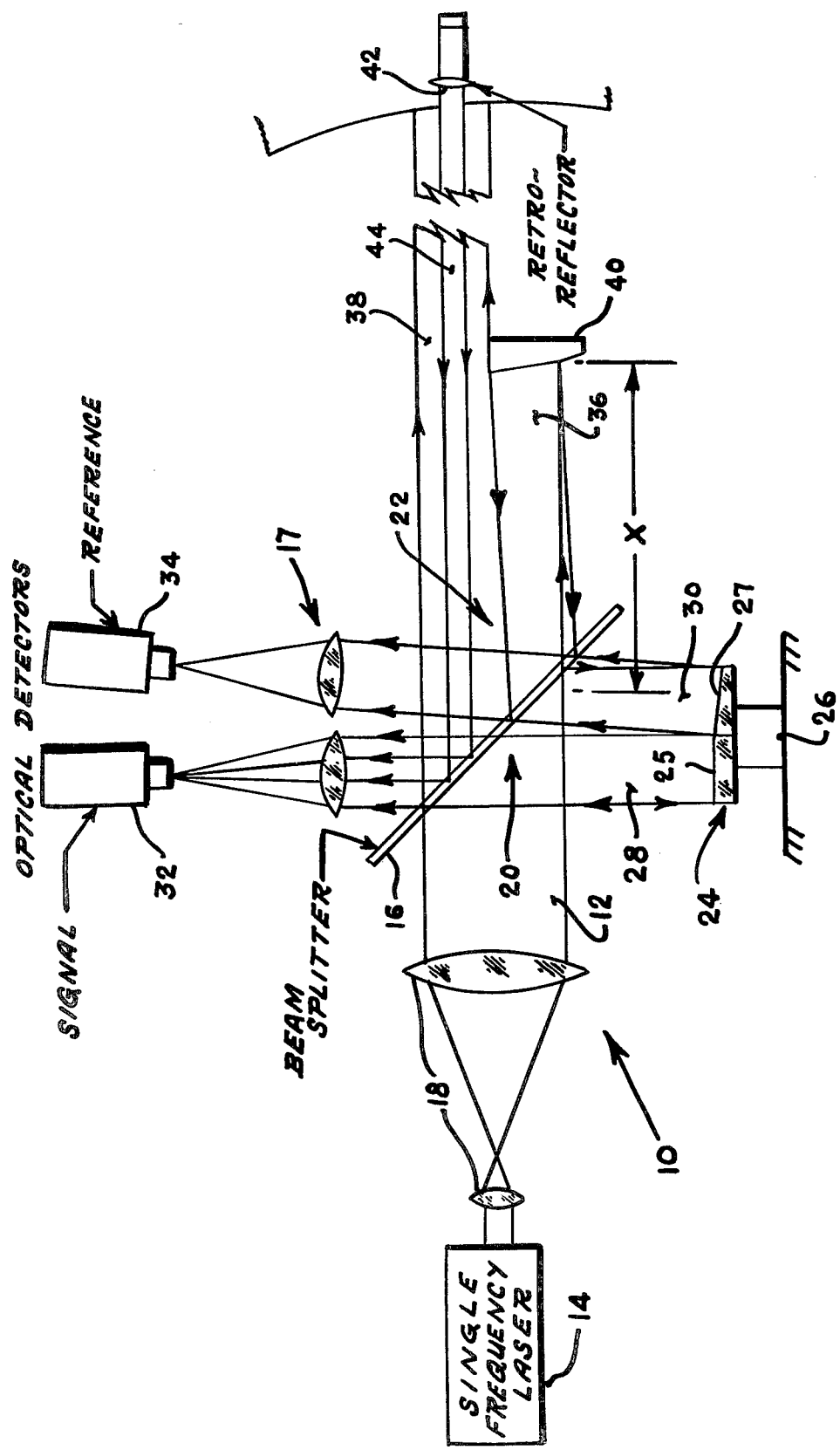
FIG. 1 is a schematic representation of the interferometer of this invention.

Reference is now made to FIG. 1 of the drawing which schematically illustrates the interferometer 10 of this invention capable of measuring the differential phase shift between two paths, a known or reference path and a unknown path, is to be measured at each of several wavelengths. The unknown distance is then calculated by a technique as set forth, for example, in U.S. patent application Ser. No. 152,232 filed May 22, 1980 by the inventor. It should be realized, however, that although the interferometer 10 of this invention finds its main utility as a differential phase shift measuring device is in the measurement technique of U.S. patent application Ser. No. 152,232 referred to hereinabove, interferometer 10 may be utilized with any technique or system wherein this differential phase shift is to be measured.

Providing a beam 12 of electromagnetic radiation utilized with interferometer 10 of this invention is any suitable source of electromagnetic radiation, preferably in the form of a continuous, single mode and single output laser 14. The actual wavelength utilized with interferometer 10 is determined by operational considerations and is not essential for the operation of this invention. For example, a $CO_2$ laser operating at 10.6 microns would be acceptable. In optical alignment with beam 12 is any conventional beam directing element in the form of, for example, a beam splitter 16. Optically interposed between laser 14 and beam splitter 16 are conventional optical elements such as lenses 18 which expand beam 12 to fill beam splitter 16. Beam splitter 16 divides beam 12 into a pair of beams, one designated local beam 20 and the other designated as remote beam 22.

Local beam 20 impinges upon a reflecting element 24 situated in optical alignment therewith. Reflecting element 24 is mounted on a conventional translating device such as a piezoelectric phase shifter 26. The piezoelectric shifter 26 is a type of linear electro-mechanical transducer, the length of which changes with applied voltage. Reflecting element 24 is designed with a pair of angularly abutting reflective surfaces 25 and 27 so as to divide local beam 20 into two portions 28 and 30, with each portion being separated by a slight angle. These two portions 28 and 30, of beam 20 are reflected back through beam splitter 16 and a pair of focusing elements such as lenses 17 so as to impinge on a pair of conventional detectors 32 and 34, respectively. Any suitable detectors may be utilized with this invention which are capable of responding to the amplitude of the chosen optical signal. For example, HgCdTe or pyroelectric detectors are suitable for a 10.6 micron detector. Photomultipliers or photodiodes are suitable for visible and near IR wavelengths. Detector 32 will hereinafter be referred to as the signal detector while detector 34 will hereinafter be referred to as the reference detector.

The remote beam 22 is also divided into two portions 36 and 38. This is achieved by any suitable reference flat 40 optically aligned with and intercepting beam 22. Reference flat 40 is situated within the path of beam 22 so as to reflect portion 36 of beam 22 back to beam splitter 16 and from there to reference detector 34. The distance, x, at which reference flat 40 is positioned from the midpoint of beam 36 on beam splitter 16 is known.

The other portion 38 of beam 22 continues past reference flat 40 toward a target or object an unknown distance from beam splitter 16. At the target any conventional retro-reflector 42 reflects a portion 44 of beam 22 impinging thereupon back to beam splitter 16 from whence it is directed to signal detector 32.

At reference detector 34 the two beam portions 30 and 36 impinging thereupon, one from the phase shifter 26 and the other from the reference flat 40 form interference fringes thereby causing intensity variations as a function of the differential path lengths. The beam portions 26 and 44, one from phase shifter 26 and the other from retro-reflector 42 which impinge upon signal detector 32 cause interference fringes to take place on detector 32, also creating intensity variations thereon as a function of differential path lengths.

In other words, what has taken place within interferometer 10 of this invention, is that two Michelson interferometers are formed with one arm length of each being controlled by the common phase shifter 26. The transfer function measured from phase shifter 26 to either detectors 32 and 34 will be sinuisoidal with a full cycle for each half-wavelength of phase shifter travel. That is, the amplitude of the detected optical signal will vary sinuisoidally as a function of the position of phase shifter 26. Phase shifter 26 introduces phase shift by adding or subtracting length to one path of the interferometer. The phase difference between these two sinuisoidal detector outputs represents the optical phase difference between the reference (known) a signal (unknown) paths of remote beam 22 of interferometer 10. In addition, the voltage required to scan phase shifter 26 over one wavelength can be measured thereby allowing calibration of phase shifter 26 against the particular wavelength being used.

Figure 2:
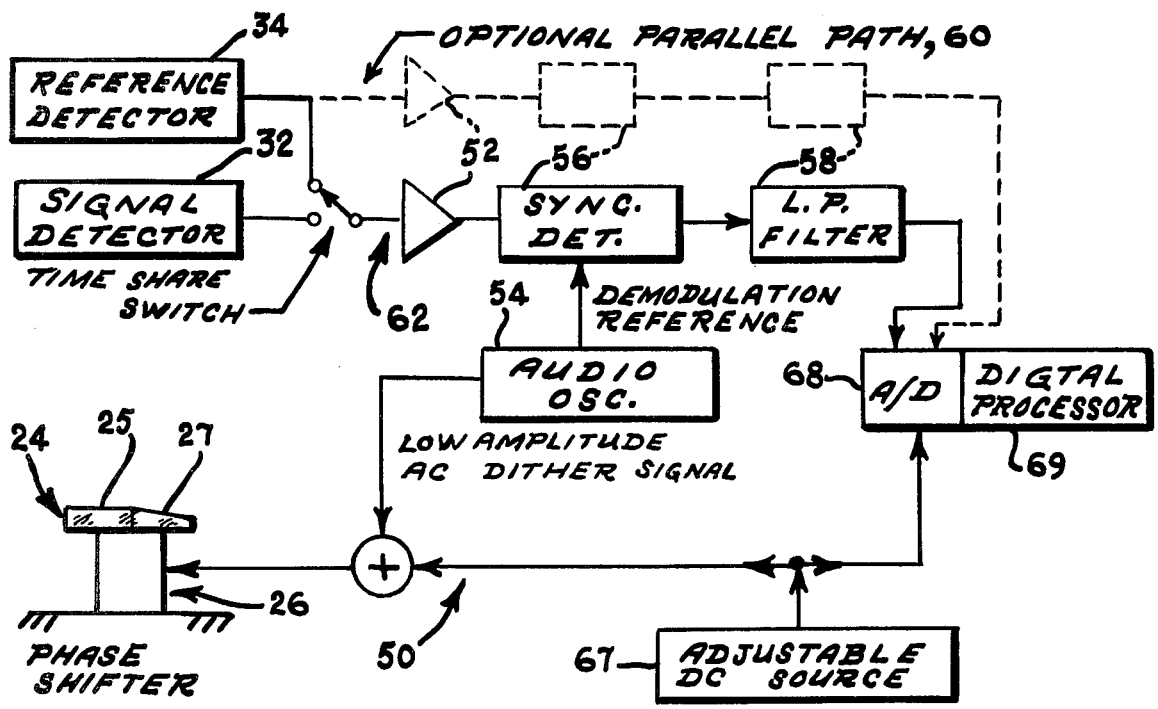
FIG. 2 is a schematic representation of the signal processing electronics utilized with the interferometer of this invention.

For further clarification of the operation of interferometer 10 reference is now made to FIG. 2 of the drawing which illustrates schematically an electrical circuit 50 which forms part of interferometer 10. The electrical circuit 50 depicted in FIG. 2 of the drawing offers several advantages for interferometer 10 of this invention. It will avoid 1/f noise in detectors 32 and 34 and preamplifiers 52, allow measurement and calibration in a single process and provide calibration for non-linear phase shifter motion.

To avoid 1/f noise, a lock-in (synchronous) technique is used which measures the differential of the transfer function as opposed to the actual transfer function. A low amplitude AC drive is applied to phase shifter 26 by a conventional audio oscillator 54 which in turn modulates the optical interference pattern and hence the intensities of detectors 32 and 34. Synchronous demodulation which occurs in conventional synchronous detectors 56 recovers the signal, while low pass filtering by conventional low pass filters 58 may be used to arbitrarily reduce the noise bandwidth. As shown in FIG. 2 of the drawing two signal path possibilities are illustrated. A parallel path 60 and a time shared path 62. The choice between these two paths 60 and 62 is dependent upon system operating parameters.

Figure 3:
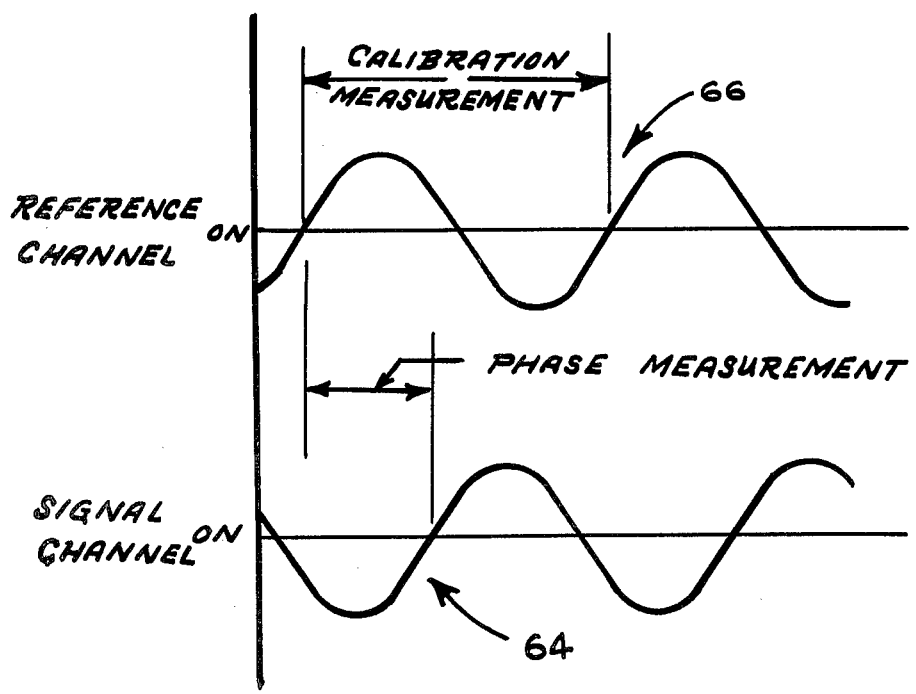
FIG. 3 is a graphic representation of the transfer functions derived with the interferometer of this invention.

The transfer functions 64 and 66 are illustrated in FIG. 3 of the drawing. The transfer functions 64 and 66 are sinuisoidal but the phase of the two sinuisoids is shifted 90° since the synchronous measurement process differentiates the actual transfer function. The phase relationship between the two signals remains the same.

Referring once again to FIG. 2 of the drawing the two output signals and the DC signal provided by any conventional adjustable DC source 67 that is applied to phase shifter 26 are converted to digital format by a conventional analog to digital converter 68 and stored. For maximum accuracy, the DC signal should be exercised through several optical wavelengths to provide as many data points as possible. Thereafter digital processing by any suitable conventional digital processor 69 in the form of, for example, any one of the PDP-11 series minicomputers made by Digital Equipment Corporation can be used to estimate the phase difference between the two paths. Since the true transfer function is known, curve fitting algorithms may be used to remove non-linear phase shifter response. The phase shift difference between the two signals and hence between the two paths may be estimated by comparison of the reconstructed sinusoids. In other words, the optical output signal will vary sinusoidally as a function of the displacement of phase shifter 26. The measured samples will approximate this sinusoidal behavior but will not be exact due to noise and distortion. By using least squares or other curve fitting techniques, a sinusoidal signal may be fitted to the measured data to obtain the best approximation to the true transfer function. The only critical distance in the optical layout shown in FIG. 1 of the drawing is the spacing between beamsplitter 16 and reference flat 40. All of the distances or path lengths in the interferometer 10 of this invention are non-critical since they do not change the relative measurement between the two paths in remote beam 22.

Reference is now made to FIG. 4 of the drawing which illustrates in schematic fashion an alternate embodiment of this invention, in the form of interferometer 70, for measuring the differential phase shift between two paths. Since many of the elements utilized with interferometer 70 illustrated in FIG. 4 of the drawing are identical to the elements described with reference to interferometer 10 set forth in FIG. 1 of the drawing, like elements in both FIGS. 1 and 4 will be designated by the same numerals.

The major differences between interferometer 70 of FIG. 4 and interferometer 10 of FIG. 1 are the replacement of the reflecting element or mirror 24 with a two-surface mirror 72, (wherein one of the surfaces 73 is partially transmissive), and the replacement of reference flat 40 with a concentric or annular reference flat 74. Additionally, a single lens 76 may be utilized to replace the double lenses 17 shown in FIG. 1 in order to focus the portions 28, 30, 36 and 44 of beams 20 and 22 on detectors 32 and 34, respectively. Instead of directly focusing these beams on the detectors 32 and 34, a corner or triangular reflector 78 may be utilized in order to direct these beams onto the appropriate detector.

The operation of interferometer 70 is identical to the operation of interferometer 10. Therefore a detailed discussion of this operation need not be repeated with respect to interferometer 70. Just as in the interferometer 10 shown in FIG. 1, interferometer 70 relies upon the interference fringes on detectors 32 and 34 thereby causing intensity variations as a function of differential path length.

Although this invention has been described with reference to particular embodiments, it will be understood to those skilled in the art that this invention is also capable of further and other embodiments within the spirit and scope of the appended claims.

I claim:

1. A self-calibrating interferometer comprising: means for providing a first beam of electromagnetic radiation, beam splitting means optically aligned with said electromagnetic beam for splitting said beam into a first path beam and a second path beam; first means optically aligned with the first path beam for dividing said first path beam into a first portion beam and a second portion beam and for reflecting said first portion beam and said second portion beam of said first path beam therefrom; distance altering means, operably connected to said first means, for altering the distance of said first means from said beamsplitting means; second means, located a preselected distance from said beamsplitting means and optically aligned in said second path beam, for dividing said second path beam into a first portion beam and a second portion beam and for reflecting said first portion beam of said second path beam therefrom; means located an unknown distance from said beamsplitting means and optically aligned in said second path beam for reflecting said second portion beam of said second path beam therefrom; first detecting means optically aligned with said reflected first portion beam of said first path beam and said second portion beam of said second path beam for detecting said first portion beam of said first path beam and said second portion beam of said second path beam and producing an output in accordance therewith; second detecting means optically aligned with said second portion beam of said first path beam and said first portion beam of said second path beam for detecting said second portion beam of said first path beam and said first portion beam of said second path beam and producing an output in accordance therewith; and comparing means operably connected to said first detecting means and said second detecting means for comparing said outputs received therefrom.

2. A self-calibrating interferometer as defined in claim 1 wherein said first means comprises a pair of reflective surfaces angularly disposed from one another.

3. A self-calibrating interferometer as defined in claim 1 wherein said second means comprises a reference flat interposed within said second path beam.

4. A self-calibrating interferometer as defined in claim 3 wherein said reference flat has an annular configuration.

5. A self-calibrating interferometer as defined in claim 1 wherein said distance altering means comprises a piezoelectric phase shifter.

6. A self-calibrating interferometer as defined in claim 1 wherein said distance altering means comprises an electro-mechanical transducer and means to apply a low amplitude AC drive thereto.

7. A self-calibrating interferometer as defined in claim 6 wherein said first means comprises a pair of reflective surfaces angularly disposed from one another.

8. A self-calibrating interferometer as defined in claim 6 wherein said second means comprises a reference flat interposed within said second path beam.

9. A self-calibrating interferometer as defined in claim 8 further comprising: means, operably interposed between said first detecting means and said second detecting means, for receiving said reflected first portion beam and said reflected second portion beam of said first path beam and said reflected first portion beam and said reflected second portion beam of said second path beam and directing said first portion beam of said first path beam and said second portion beam of said second path beam to said first detecting means and directing said second portion beam of said first path beam and said first portion beam of said second path beam to said second detecting means.

10. A self-calibrating interferometer as defined in claim 1 further comprising: means, operably interposed between said first detecting means and said second detecting means, for receiving said reflected first portion beam and said reflected second portion beam of said first path beam and said reflected first portion beam and said reflected second portion beam of said second path beam and for directing said first portion beam of said first path beam and said second portion beam of said second path beam to said first detecting means and for directing said second portion beam of said first path beam and said first portion beam of said second path beam to said second detecting means.

* * * * *